(12) United States Patent
Lüssi et al.

(10) Patent No.: US 10,485,371 B2
(45) Date of Patent: Nov. 26, 2019

(54) MODULAR BREWING UNIT FOR A COFFEE MACHINE

(71) Applicant: Schaerer AG, Zuchwil (CH)

(72) Inventors: André Lüssi, Jegenstorf (CH);
Hans-Ulrich Hostettler, Wichtrach (CH)

(73) Assignee: SCHAERER AG, Zuchwil (CH)

( * ) Notice: Subject to any disclaimer, the term of this patent is extended or adjusted under 35 U.S.C. 154(b) by 596 days.

(21) Appl. No.: 15/030,626

(22) PCT Filed: Oct. 6, 2014

(86) PCT No.: PCT/EP2014/071338
§ 371 (c)(1),
(2) Date: Apr. 20, 2016

(87) PCT Pub. No.: WO2015/058952
PCT Pub. Date: Apr. 30, 2015

(65) Prior Publication Data
US 2016/0249762 A1    Sep. 1, 2016

(30) Foreign Application Priority Data

Oct. 21, 2013 (CH) .................................. 1786/2013

(51) Int. Cl.
*A47J 31/00* (2006.01)
*A47J 31/06* (2006.01)
*A47J 31/36* (2006.01)

(52) U.S. Cl.
CPC ....... *A47J 31/0647* (2013.01); *A47J 31/3614* (2013.01); *A47J 31/3619* (2013.01); *A47J 31/3671* (2013.01)

(58) Field of Classification Search
CPC ................ A47J 31/3614; A47J 31/3619; A47J 31/3671; A47J 31/0663; A47J 31/0647
(Continued)

(56) References Cited

U.S. PATENT DOCUMENTS 5,367,947 A    11/1994 Lussi et al.
7,216,582 B2 *    5/2007 Yoakim ............... A47J 31/0668
99/289 R
(Continued)

FOREIGN PATENT DOCUMENTS

CA    2889979    *    4/2014    .......... A47J 31/0647
EP    0217198 A1    4/1987
(Continued)

OTHER PUBLICATIONS

International Search Report dated Jan. 28, 2015 for PCT/EP2014/071338.

*Primary Examiner* — Reginald Alexander
(74) *Attorney, Agent, or Firm* — Pearne & Gordon LLP (57) ABSTRACT

The invention relates to a modular brewing unit for a coffee machine, comprising a brewing part and a drive part, which are arranged parallel one beside the other in a common frame, wherein the brewing part, arranged concentrically along a common first axis, has an upper piston, a lower piston and, between the two pistons, a brewing cylinder with a cylindrical bore for accommodating the two pistons, a brewing chamber being formed in the process, and wherein the drive part comprises a spindle which extends along a drive axis, parallel to the first axis, is mounted in the frame such that it can be rotated about said drive axis and is in engagement with the brewing cylinder and the lower piston such that, during a brewing cycle, upon rotation of the spindle, the brewing cylinder and the lower piston are displaced along the first axis relative to the upper piston, which is fixed in the frame. Different brewing units are realized in a simplified manner in that the drive part can be combined with brewing parts of different designs in order to provide for different brewing conditions.

8 Claims, 7 Drawing Sheets

(58) Field of Classification Search
USPC .................................... 99/302 P, 289 R, 284
See application file for complete search history.

(56) References Cited

U.S. PATENT DOCUMENTS

| | | | | |
|---|---|---|---|---|
| 8,402,882 | B2 * | 3/2013 | De' Longhi | A47J 31/3614 |
| | | | | 99/289 R |
| 8,596,188 | B2 * | 12/2013 | Wuthrich | A47J 31/3619 |
| | | | | 99/289 R |
| 2010/0307345 | A1 | 12/2010 | Wuthrich | |

FOREIGN PATENT DOCUMENTS

| | | | | |
|---|---|---|---|---|
| EP | 0538191 | A1 | 4/1993 | |
| EP | 1774879 | * | 4/2007 | ......... A47J 31/0647 |
| FR | 2142885 | * | 2/1973 | ......... A47J 31/0647 |
| JP | 2007-018430 | A | 1/2007 | |
| WO | 2009040227 | A1 | 4/2009 | |
| WO | 2009056426 | A1 | 5/2009 | |
| WO | 2009118246 | A1 | 10/2009 | |

* cited by examiner

MODULAR BREWING UNIT FOR A COFFEE MACHINE

TECHNICAL AREA

The present invention is direct to the field of coffee machines. It relates to a modular brewing unit for a coffee machine according to the preamble of claim 1.

PRIOR ART

Motor-driven, automatically operating brewing units for coffee machines, particularly automatic coffee makers, have been known and in successful operation for a long time, made almost entirely of plastic, of compact design and particularly appreciated for their sturdiness, excellent brewing results and faultless long-term operability. Such a brewing unit, as is known for example from documents WO 2009040227 A1 or WO 2009056426 A1 or WO 2009118246 A1 by the Applicant, is illustrated in a longitudinal cross section in FIG. 1.

Figure 1:
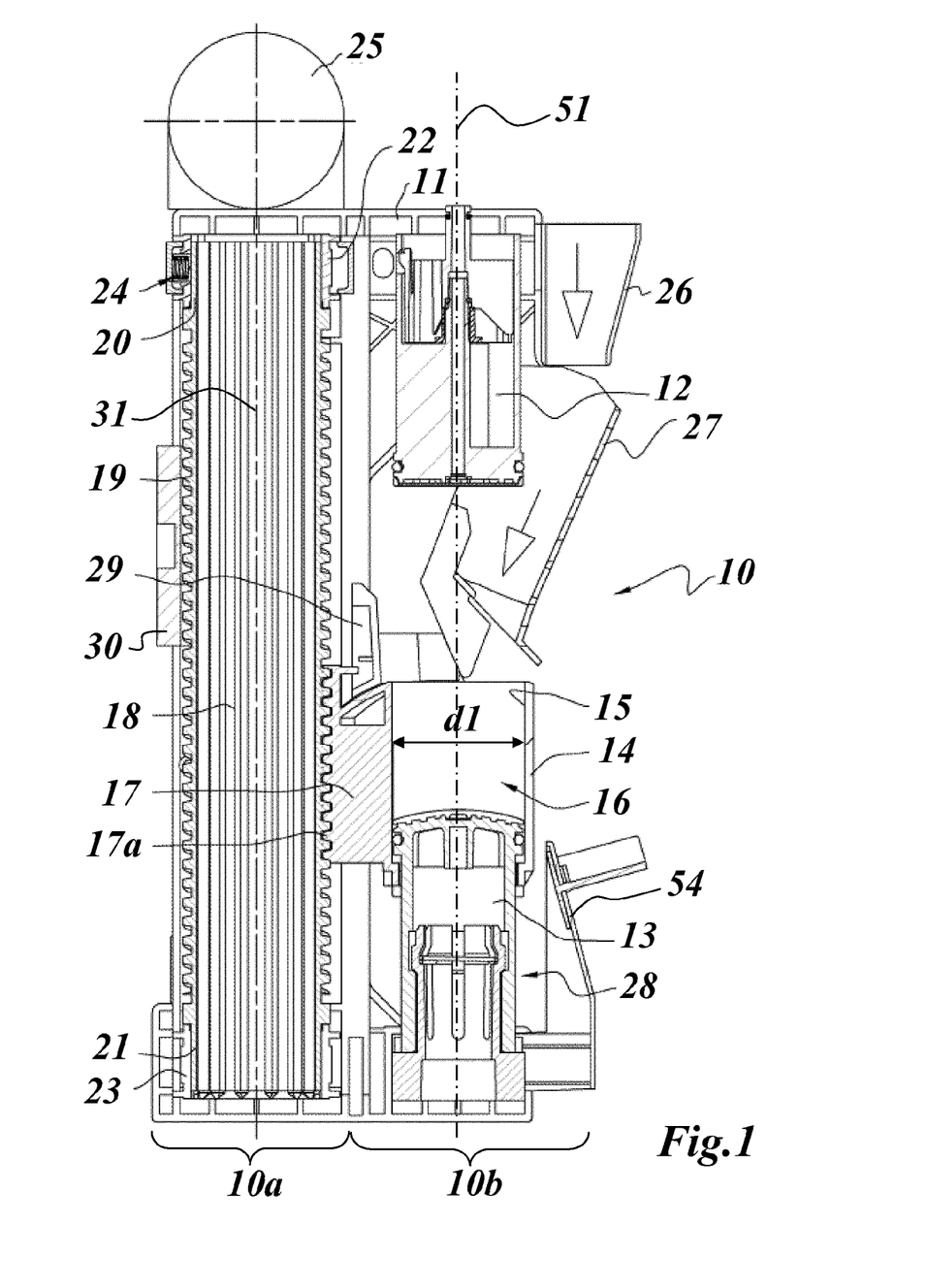
FIG. 1 shows a lengthwise cross section through a brewing unit such as is known for example from document WO 2009118246 A1.

The brewing unit 10 shown in FIG. 1 comprises an approximately cuboid frame 11 with two parallel side walls and a front side, and a rear side in which a brewing part 10b and a driving part 10a are accommodated one behind the other and with their axes 51 and 31 parallel to one another. The driving part 10a comprises a spindle 18 which extends for the full height, which are supported so as to be rotatable about a vertical axis 31 with an upper bearing pin 20 and a lower bearing pin 21 in corresponding bearing rings 22 and 23 in frame 11. A bearing element 24 is inserted in bearing ring 22 and absorbs the freeplay between bearing pin 20 and bearing ring 22. Spindle 18 is hollow inside, and in the example of FIG. 1 is drivable by an electric motor 25 arranged on top, which motor is also mounted on frame 11. On the outside thereof is a thread 19 with a trapezoidal cross sectional profile.

As may be seen in FIG. 1, and is explained for example in WO 2009118246 A1 brewing part 10b of brewing unit 10 comprises an upper piston 12 which is retained in fixed manner in frame 11. A lower piston 13 is arranged axially opposite upper piston in axis 51, and is axially displaceable relative to upper piston 12. This lower piston 13 is accommodated in a cylindrical bore 15 of a brewing cylinder 14, which brewing cylinder 14 is also axially displaceable. Brewing cylinder 14 is equipped with a dog 17, on which a threaded part 17a is mounted, which threaded part 17a is in engagement with the thread 19 on spindle 18 of driving part 10a.

In FIG. 1, brewing part 10b is shown in the filling position. This means that lower piston 13 is in its lowest position, in which it is held in place by a detent device 28 mounted on frame 11. Lower piston 13 has reached this position because brewing cylinder 14 has also been brought to its lowest position by the rotation of spindle 18, and at the same time entrained lower piston 13 until it is engaged in detent device 28. After this, brewing cylinder 14 has been raised upwards again by corresponding rotation of spindle 18 in the opposite direction until it has reached the position shown in FIG. 1. During this operation, lower piston 13 has remained in its lowest position, so that brewing cylinder 14 has been raised relative to lower piston 13. As a consequence, brewing chamber 16 has formed inside brewing cylinder 14, with its bottom end closed off by lower piston 13. In brewing part 10b, a wiper 29 that is swivelable transversely to axis 51 is provided, which in the filling position shown in FIG. 1 is located in its resting position above dog 17, so that brewing chamber 16 can be accessed from above without obstruction.

As is described in the aforementioned WO 2009118246 A1, freshly ground coffee powder is added to brewing chamber 16 at the start of a brewing cycle. This coffee powder has previously been ground in known manner in a coffee mill, which is not shown but which is also accommodated in the corresponding coffee machine. The coffee powder passes through a first funnel 26 into a second, swivelable funnel 27, via which the ground coffee powder is introduced into brewing chamber 16. To this end, the swivelable funnel 27, which is supported in swiveling manner on frame 11, is pivoted inwardly, in the filling position. The added coffee powder thus passes into brewing chamber 16. The coffee powder to be added is measured in known manner, depending on the type of coffee that is to be drawn. In a brewing unit 10 according to FIG. 1, the quantity of coffee powder is typically about 16 g.

After brewing chamber 16 has been filled with freshly ground coffee powder, electric motor 25 begins to rotate spindle 18. Brewing cylinder 14 is raised by means of threaded part 17a on dog 17, and lower piston 13 is entrained by means of corresponding dogs and disengaged from detent device 28. Brewing cylinder 14 and lower piston 13 are raised until brewing chamber is closed off by upper piston 12 and the coffee powder in brewing chamber 16 is compressed by upper piston 12.

In this brewing position, hot water is now introduced into brewing chamber 16 in known manner from below, flowing from bottom to top through brewing chamber 16 and the ground coffee powder located therein, and is drained as brewed coffee through a drain channel provided in known manner in upper piston 12, then via a conduit (not shown) into an outlet of the coffee machine, from where is allowed to drain into a receptacle, a mug or cup, placed below it in readiness.

For the purpose of brewing the coffee, the coffee powder in the brewing chamber 16 is compressed between the two pistons 12 and 13 in such manner that it sets up a resistance to the brewing water flowing through it, with the result that the brewing water must be forced through the brewing chamber under a pressure of about 8 bar. The brewed coffee powder remains inside brewing chamber 16 and forms a coffee powder cake, which is very compact and moist. In order to avoid displacement of the brewing cylinder 14 and therewith also the lower piston 13 when the brewing pressure is applied due to the shearing forces generated thereby in conjunction with trapezoidal threads 19, a support plate 30 is arranged in fixed manner on the opposite side of spindle 18 and at the same height as the location of the brewing chamber 16 during brewing, to help to prevent spindle 18 from being bent.

When brewing cylinder 14 together with lower piston 13 is raised from the filling position shown in FIG. 1, swivelable funnel 27 is pivoted back outwards, wherein this action takes place against a spring force acting on swivelable funnel 27. The act of swinging the swivelable funnel 27 away has the effect of vacating the space between upper piston 12 and brewing cylinder 14, so that brewing cylinder 14 does not collide with swivelable funnel 27 when brewing chamber 16 is raised. For this purpose, the length of swivelable funnel 27 and its angle of inclination must be synchronised with the height and travel path of brewing cylinder 14.

After the brewing operation has been completed, brewing chamber 16 is opened by lowering brewing cylinder 14 and lower piston 13 again by means of corresponding rotation of spindle 18. In this operation, the bottom end of lower piston 13 reaches detent device 28 and is braced thereon. Brewing cylinder 14 is lowered further, while lower piston 13 stops moving, causing the coffee powder cake to be squeezed out of brewing cylinder 14. When the upper edge of the descending brewing cylinder 14 has reached the upper edge of lower piston 13, the ejected coffee powder cake lies on top of lower piston 13 auf, lower piston 13 is entrained with brewing cylinder 14 as it is lowered further by means of corresponding limit stops, and introduced into detent device 28. When both brewing cylinder 14 and lower piston 13 reach the area of the lower position, wiper 29, which is attached in known, articulated manner to brewing cylinder 14, is actuated mechanically via a swing arm mounted on frame 11. This causes the wiper 29 to move sideways over lower piston 13 and wipe the coffee powder cake off lower piston 13 and brewing cylinder 14. The coffee powder cake the slides down a chute 54 and into a collection container (not shown) provided for this purpose.

The mechanism of FIG. 1 as described in the preceding text has been proven to work excellently in practice. However, it is configured in the respective variation of brewing part 10b to deal with a predetermined quantity of coffee powder, which may be about 16 g, for example.

This is capable of responding to many use cases.

However, the desire exists to be able to process different fill quantities optimally as well, e.g., 10 g or 30 g of coffee powder, in order to obtain correspondingly different quantities of liquid per brewing cycle. To achieve this end, however, for reasons of cost and time it should not be necessary to completely redesign the brewing unit.

On the other hand, it should be borne in mind that different powder quantities, and thus also different brewing chamber volumes, may lead to altered conditions when the powder is compressed, and when the brewing water flows through the powder.

BRIEF DESCRIPTION OF THE INVENTION

An object of the invention is therefore to create a brewing unit that can be modified easily to realised different brewing conditions, such as different quantities of coffee powder per brewing cycle, with unchanged outer dimensions.

This object is solved with the features of claim 1.

The invention takes as its starting point a modular brewing unit for a coffee machine, comprising a brewing part and a driving part, which are arranged parallel beside each other in a common frame, wherein the brewing part has, arranged concentrically along a common first axis, an upper piston, a lower piston, and a brewing cylinder between the two pistons, having a cylindrical bore to accommodate the two pistons, forming a brewing chamber, and wherein the driving part comprises a spindle that extends along a drive axis parallel to the first axis, is mounted in the frame so as to be rotatable about said drive axis, and is in engagement with the brewing cylinder and the lower piston such that, during a brewing cycle, when the spindle is rotated the brewing cylinder and the lower piston are displaced along the first axis relative to the upper piston which is mounted in fixed manner in the frame.

It is characterised in that, in order to create different brewing conditions the driving part is combinable with differently constructed brewing parts.

One variation of the invention is characterised in that the differently constructed brewing parts are designed to accommodate different quantities of coffee powder per brewing cycle.

In particular in this context, the differently constructed brewing parts differ in the size of the brewing chamber.

The differently constructed brewing parts preferably differ in the internal diameter of the brewing chamber, wherein the external diameters of the upper and lower pistons are adapted to the internal diameter of the brewing chamber.

Another variation of the invention is characterised in that the brewing cylinder is driven by the spindle, the lower piston is mounted inside the brewing cylinder so as to be displaceable along the first axis, the lower piston is fixable in a lower end position by means of a detent device attached permanently to the frame, and the detent device remains the same for variously constructed brewing parts.

Yet another variation of the invention is characterised in that a swivelable funnel is provided on the brewing part for filling the brewing chamber with coffee powder, and that the design of the swivelable funnel is adapted to the differently constructed brewing part.

In particular, the length of the swivelable funnel is adapted to the brewing cylinder.

The swivelable funnel preferably has a curvature.

In particular, the swivelable funnel has multiple funnel sections at different inclinations.

Another variation of the invention is characterised in that the brewed coffee is discharged through the upper piston, and that the outlet behaviour in the upper piston can be altered to create different brewing conditions in the brewing part by positioning replaceable inserts in the upper piston.

In particular, the upper piston has a central passthrough for the outlet, and the replaceable inserts may be inserted, particularly screwed, in the passthrough to create a seal.

In particular, the replaceable inserts each have a cylindrical body with a concentric bore to allow the brewed coffee to pass through.

The replaceable inserts preferably have an external thread section, have a transition to a tubular spout at one end and are furnished with an external seal at the other end.

The replaceable inserts are preferably equipped with means for influencing the flow through the bore.

In particular, the means for influencing the flow through the bore have a replaceable baffle.

However, it is also conceivable that the means for influencing the flow through the bore include a non-return valve.

Another variation of the invention is characterised in that the brewing cylinder is constructed in a dog, which is in engagement with the spindle via threaded part and is guided parallel to the first axis in the frame by laterally mounted guide rails, and the guide rails are connected to the threaded part by means of a snap locking mechanism.

BRIEF EXPLANATION OF THE FIGURES

In the following, the invention will be explained in greater detail with reference to embodiments and in conjunction with the drawing. In the drawing.

WAYS TO REALISE THE INVENTION

The modular concept of the present invention provides that in if there is a change in the brewing conditions, for example if the basic quantity of coffee powder used for each brewing cycle is changed, driving part 10*a* of brewing unit is left unchanged, and the necessary design changes are only made to the brewing part. In this way, a family of similar brewing units can be derived from a basic design for the brewing unit quickly and inexpensively, in which all of the members have the same driving part 10*a*, but differ in the configuration of the brewing part.

Figure 2:
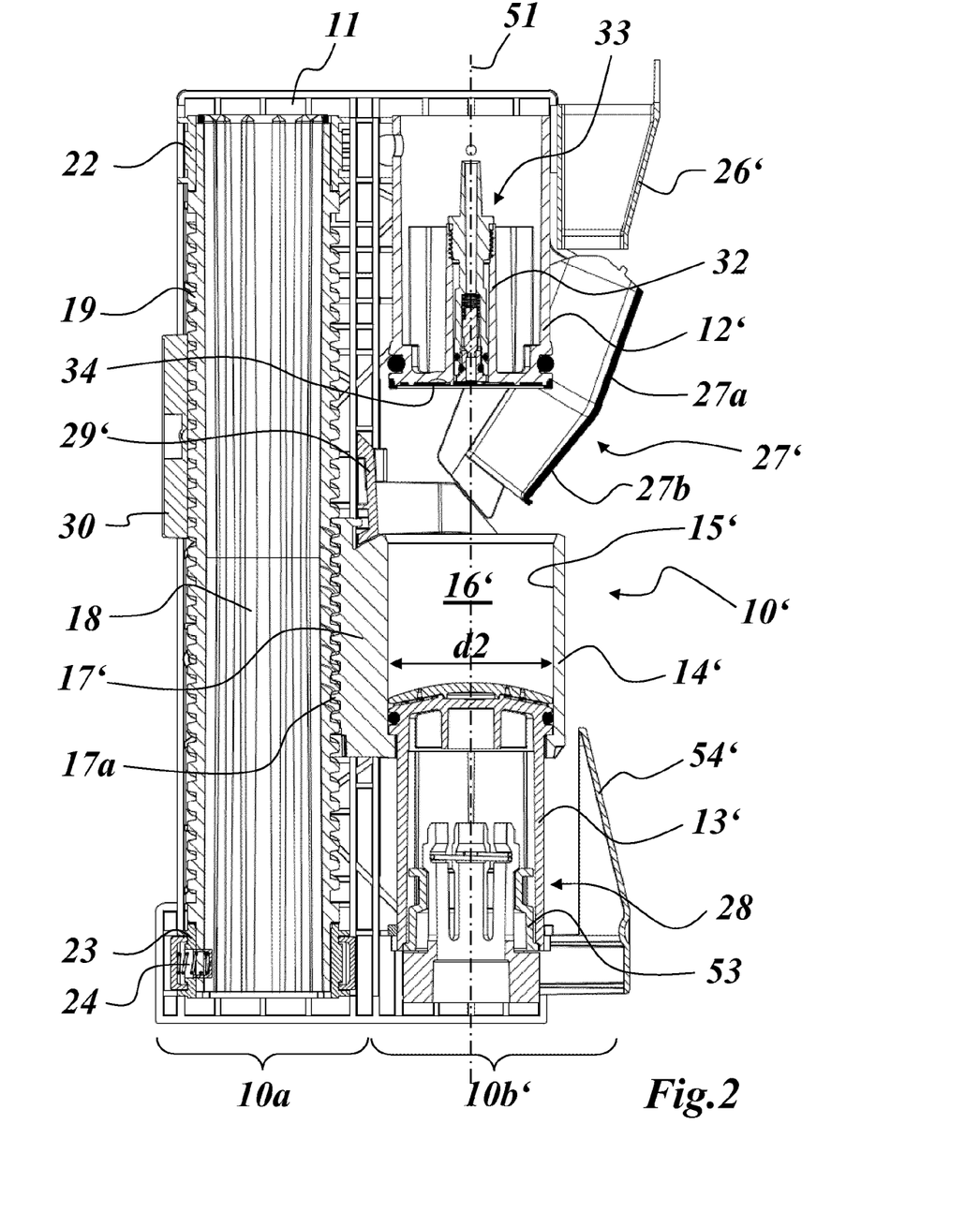
FIG. 2 shows a lengthwise cross section through a brewing unit in which according to an embodiment of the invention the brewing part is configured for a larger quantity of coffee powder (e.g., 30 g instead of 16 g) but the driving part remains the same.

In FIG. 2, an embodiment of such a derived brewing unit 10' (from the brewing unit of FIG. 1) is shown from the same point of view as brewing unit 10 of FIG. 1. Identical parts are also designated with the same reference signs. By comparing the two directly, it is immediately apparent that the frame 11, spindle 18, the bearing for spindle 18 in the frame with the bearing pins and bearing rings 22, 23, and the detent device 28, 28' are practically identical—apart from the minor difference in that the bearing element 24 in FIG. 1 is arranged on upper bearing ring 22, while in FIG. 2 it is arranged on lower bearing ring 23.

The changes in brewing part 10*b*' of FIG. 2 compared to FIG. 1 relate firstly to the basic quantity of coffee powder used per brewing cycle. In FIG. 1, a brewing cylinder 14 with a cylindrical bore 15 having internal diameter d1 is used, which diameter combines with the two pistons 12 and 13 to form a brewing chamber 16 that is designed for a basic quantity of 16 g coffee powder. Of course, the quantity of coffee powder can be altered and adjusted within a certain range starting from the basic quantity without altering or impairing the optimised compressing and brewing operation too much.

In contrast, the brewing cylinder 14' used in FIG. 2 has a cylindrical bore 15' with internal diameter d2 which is considerably larger than d1 and when combined with the two similarly larger pistons 12' and 13' creates a brewing chamber 16' that is designed for a basic quantity of 30 g of coffee powder. In order for the larger lower piston 13' to be able to interact smoothly with the practically identical detent device 28' in the manner described in the introduction, a corresponding adapter ring 53 is provided inside lower piston 13'.

Figure 3:
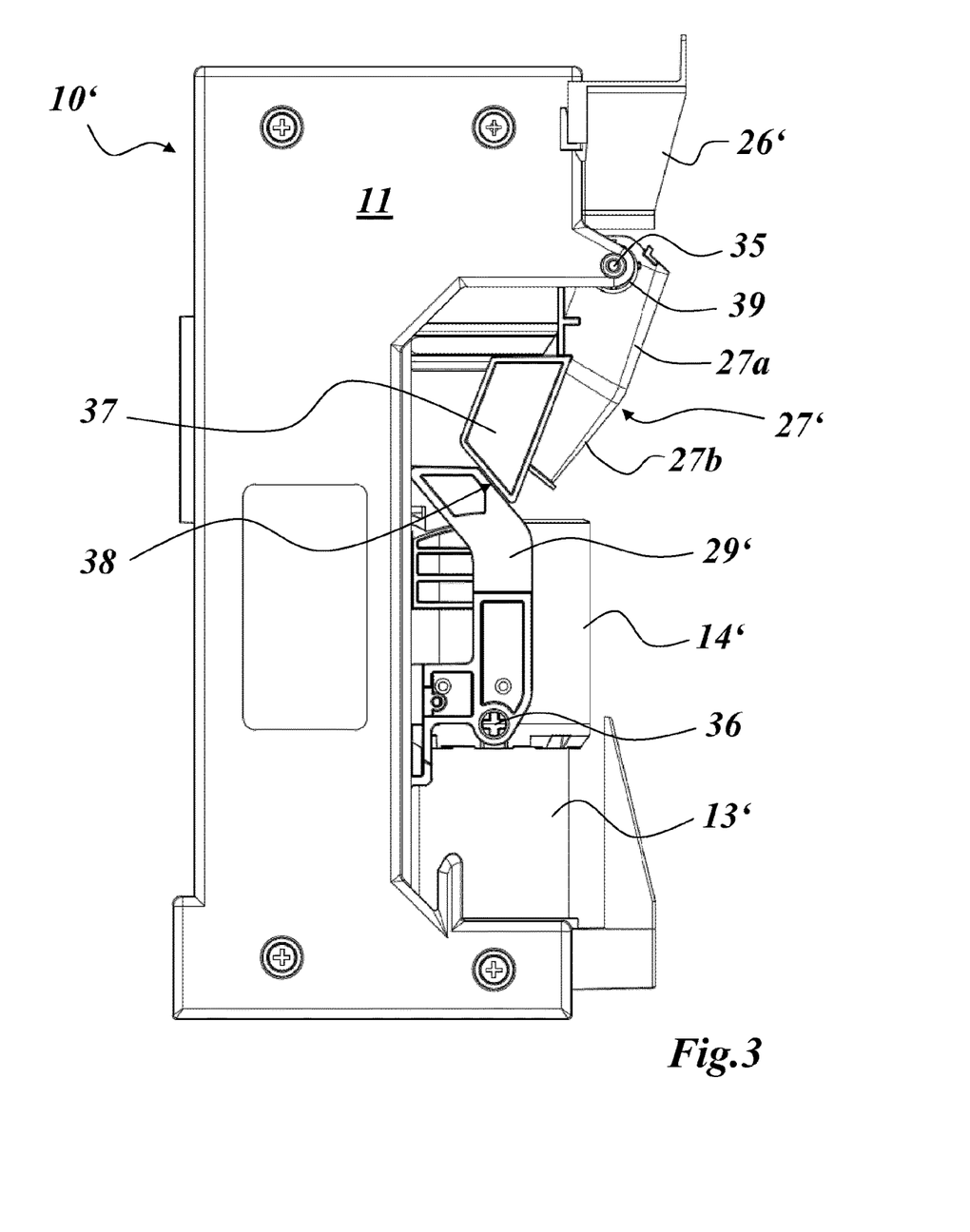
FIG. 3 shows a side view of the brewing unit of FIG. 2.
Figure 4:
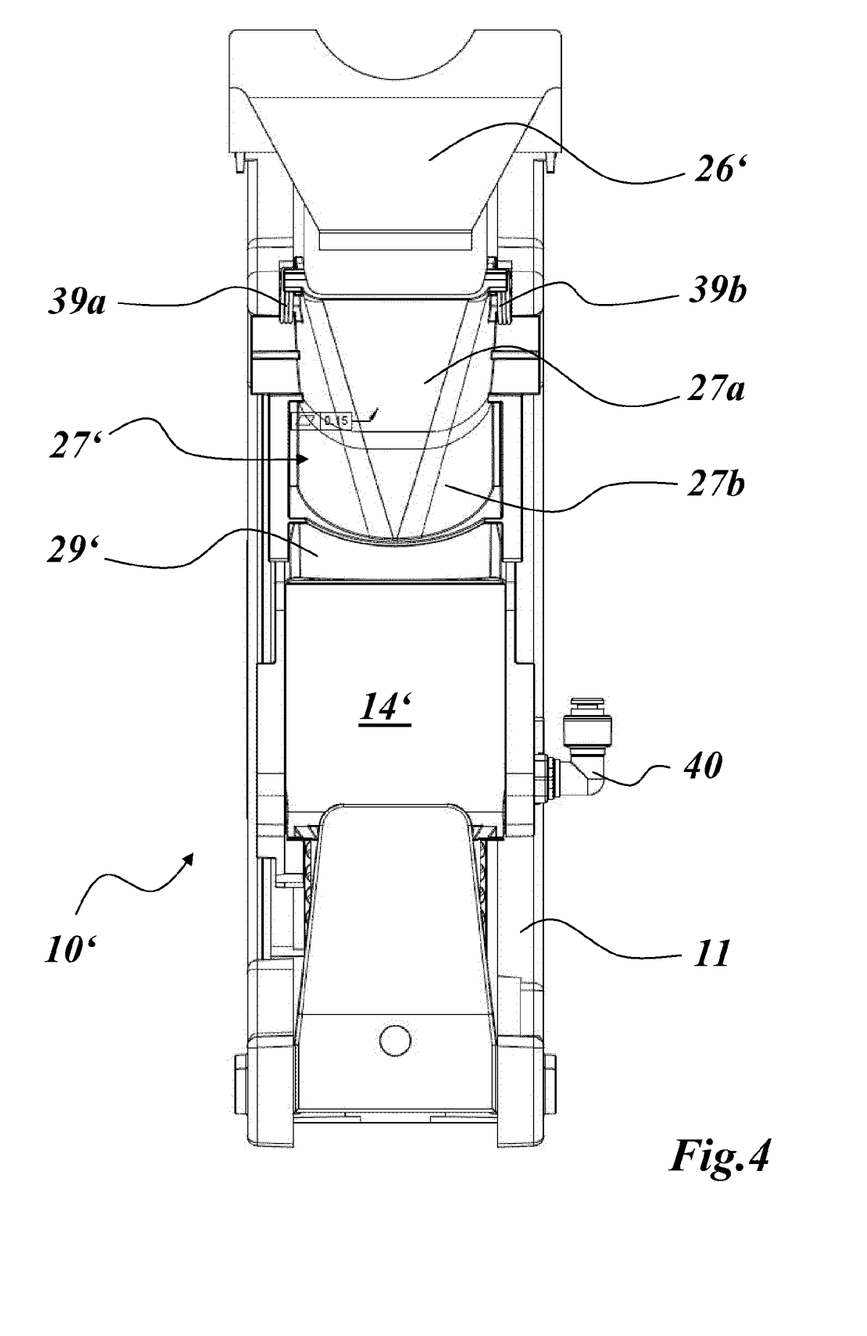
FIG. 4 shows a front view of the brewing unit of FIG. 2.

Since the larger brewing cylinder 14' in the filling position shown in FIG. 2 extends axially farther upwards than in the example of FIG. 1, swivelable funnel 27' must also be changed and adapted with respect to FIG. 1, so that a collision is avoided when the brewing cylinder is raised. For this purpose, the swivelable funnel 27' which is pivotable about swivel axis (FIG. 3) against the spring force of two torsion springs (39*a, b* in FIG. 4) is no longer constructed as a straight funnel with only one incline, but instead is slightly shortened and has an inward curvature, which in this case is created by two consecutively arranged funnel sections 27*a* and 27*b* with progressively less incline. The incline of the upper funnel section 27*a* is equivalent to the inclination of funnels 27 in FIG. 1. According to FIG. 3, a guide element 37 for swiveling is mounted on funnel 27', and moves along a guide arm 38 of the wiper 29' that is pivotable about swivel axis 36 when brewing cylinder 14' is raised (see FIG. 3). Upper funnel 26' remains practically unchanged.

Because of the larger internal diameter d2 of brewing cylinder 14', the chute 54' for the coffee powder cake that is scraped off by wiper 29' must be shifted farther out, but this can be done without making any structural changes to frame 11.

However, another possible change to brewing part 10*b* also concerns the internal construction of upper piston 12', by which the brewed coffee is guided from the brewing chamber 16' through a corresponding strainer 34 to the coffee machine outlet. Since the brewing operation requires an optimal distribution and passage of the brewing water, which is introduced through a brewing water port on the side (40 in FIG. 4), through the compressed coffee powder enclosed in brewing chamber 16', before which the powder must be moistened as evenly as possible, the passage of the brewed coffee through upper piston 12' becomes particularly important.

Figure 5:
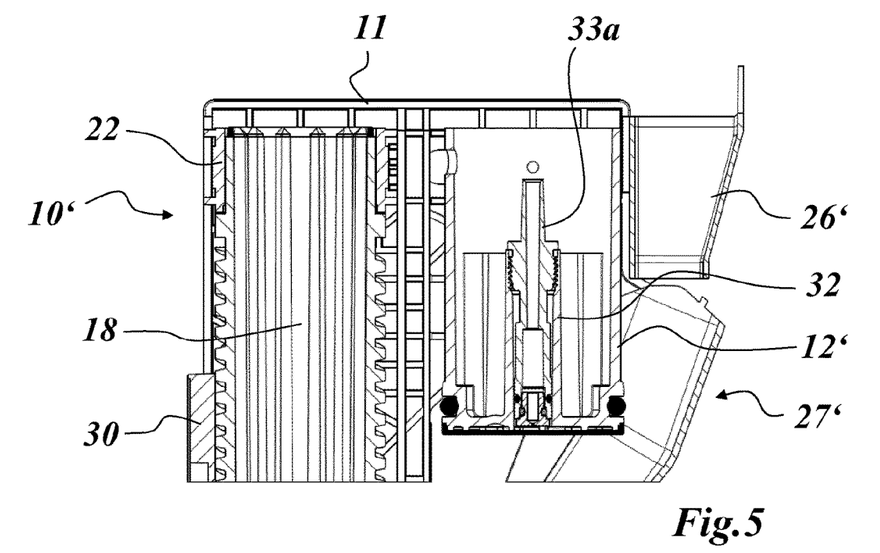
FIG. 5 shows an enlarged detail of the upper piston from the brewing unit of FIG. 2 with a first replaceable insert having a fitted baffle.
Figure 6:
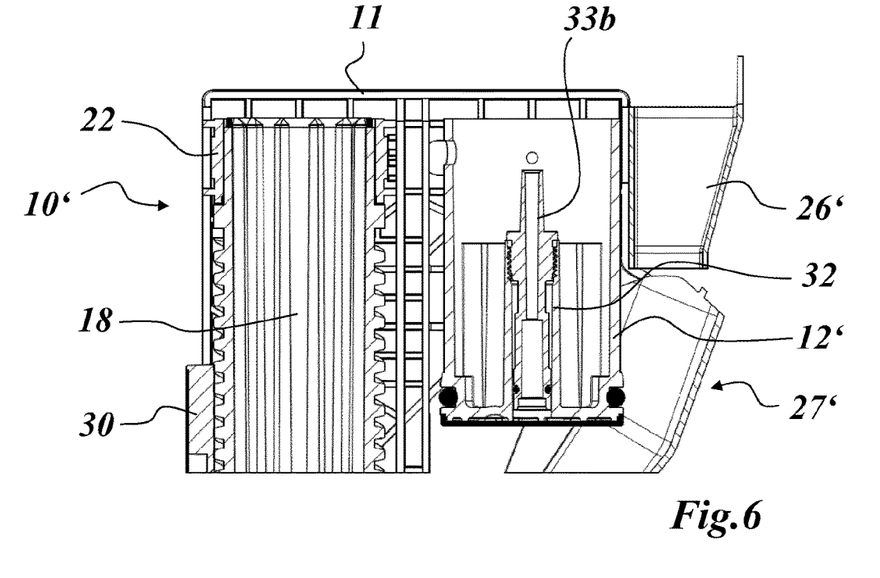
FIG. 6 shows an enlarged detail of the upper piston from the brewing unit of FIG. 2 with a second replaceable insert without flowthrough limitation.
Figure 7:
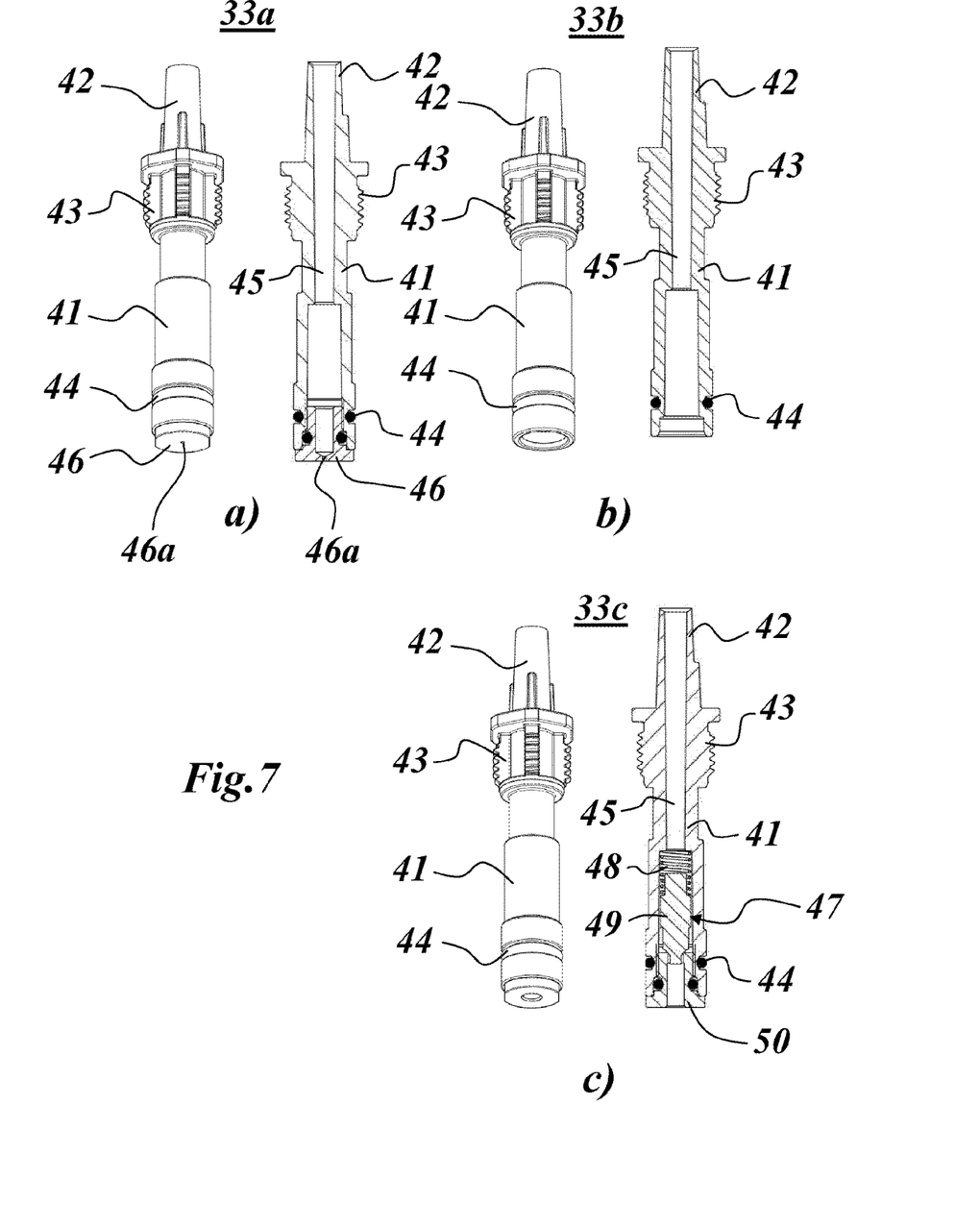
FIG. 7 in three different subfigures (a) to (c), shows three different variants of the replaceable insert for the upper piston.

In order to be able to make changes in modular manner here, an axial passthrough 32 is conformed in the centre of upper piston 12', into which replaceable inserts 33 (33*a, b* in FIGS. 5 and 6; 33*a-c* in FIG. 7) are inserted, particularly screwed to form a seal. Enlarged cross sections of two such inserts 33*a* and 33*b* are shown in FIGS. 5 and 6. FIG. 7 shows inserts 33*a* and 33*b* as separate parts (FIGS. 7*a* and *b*), and a further insert 33*c* (FIG. 7*c*).

The screwed insert 33*a* in FIG. 5, which is shown in a longitudinal cross section and in a 3-D representation in FIG. 7*a*, comprises an elongated cylindrical body with a central bore 45. On one end, a tubular spout 42 is formed on body 41, on which the outlet tube leading to the coffee machine outlet is mounted. A seal in the form of an o-ring is provided in an annular groove on the outside of the other end, sealing off the insert 33*a* in passthrough 32. On this end also, a baffle 46 having a central baffle opening 46*a* is inserted, e.g., screwed into body 41 for the purpose of sealing. The baffle reduces the flow rate enormously, and so helps to improve distribution and a lengthen the residence time of the brewing water in brewing chamber 16', thus influencing the brewing result. A thread section corresponding to a matching internal thread in passthrough 32 is conformed on the outside before the tubular spout 42 to enable insert 33*a* to be screwed on.

A further exemplary insert 33*b* according to FIGS. 6 and 7*b* has a design that is largely identical to insert 33*a*, but is not equipped with a baffle. This allows drastically higher flow rates, which in turn also results in changes to the brewing behaviour and result.

A third exemplary insert 33*c* according to FIG. 7*c* is conformed on the lower end as a non-return valve 47. A valve body 49 is pressed against a screwed-in valve seat 50 in sealing manner against the flow direction by a spring 48. If the pressure in the brewing chamber 16' rises, non-return valve 47 opens progressively to let the brewed coffee through to the outlet.

This results in a brewing characteristic that may be influenced and optimised according to the choice of spring 48, but also the passthrough cross section of the valve seat 50.

These inserts 33a-c can be fitted and replaced as desired to adapt the brewing part functionally to certain requirements. With these inserts and the replaceable pistons and brewing cylinders in the brewing part, a modular kit is provided for a reliable brewing unit that enables changes to be made to the brewing conditions inexpensively while using a common driving part. But the replaceable inserts may also be used advantageously in brewing units of the kind shown in FIG. 1, without having to make any other changes to the brewing part.

Figure 8:
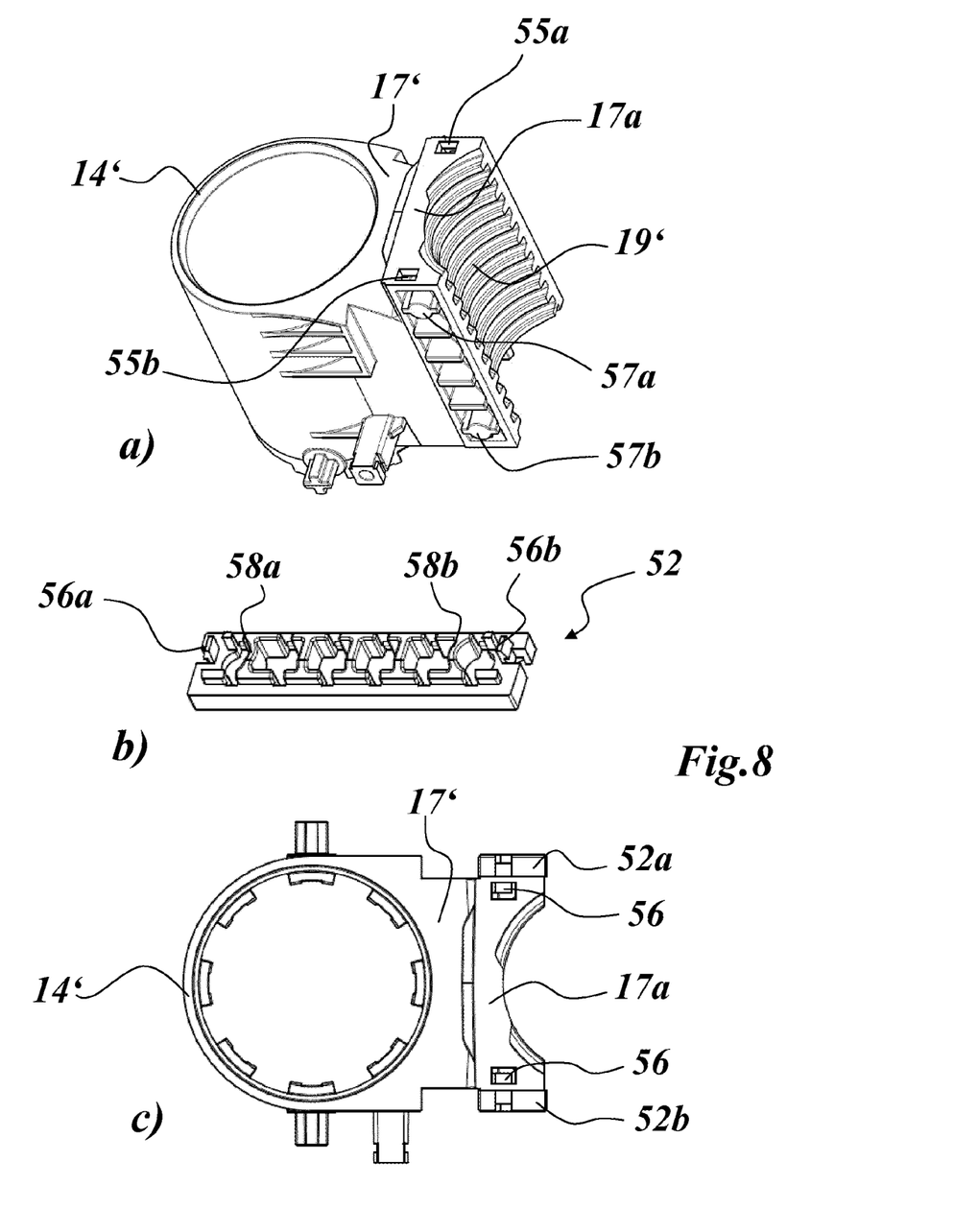
FIG. 8 in several subfigures (a) to (c), shows an advantageous configuration of the brewing cylinders, in which the guide rails necessary for guiding the brewing cylinder are designed to be folded up to the side (FIG. 8*b*).

A further simplification may also be applied to brewing cylinder 14' as shown in FIG. 8. In order to be able to move brewing cylinder 14' in the axial direction with spindle 18, brewing cylinder 14' must be guided in frame 11. For this purpose, guide rails 52a, b are arranged on the side of the threaded part 17a of dog 17', which is furnished with a corresponding trapezoidal thread 19' (FIG. 8c), with which the brewing cylinder 14' is guided in corresponding grooves in the frame. These guide rails 52a, b, which were formerly fastened to threaded part 17a with metal screws, are now connected to the side of threaded part 17a by means of a snap locking mechanism.

To realise the snap-fit function, as shown in FIG. 8a cutouts 55a, b are provided at the top and bottom on the opposite sides of threaded part 17a, and into which the guide rail 52 or 52a, b may be inserted using corresponding snap catches 56a, b (FIG. 8b). In order to retain the guide rails 52 or 52a, b, pillar-like first retaining elements 57a, b are conformed at the top and bottom on the sides of threaded part 17a (FIG. 8a), against which guide rails 52 or 52a, b abut with corresponding second guide elements (58a, b) (FIG. 8b) and along which they slide when are snapped into place.

The snap-locked guide elements 52 or 52a, b make it simpler to reconfigure the modular brewing unit further, but they may also be used advantageously on conventional brewing units.

LIST OF REFERENCE SIGNS 10,10' Brewing unit
10a Driving part
10b, 10b' Brewing part
11 Frame
12,12' Upper piston
13,13' Lower piston
14,14' Brewing cylinder
15,15' Cylindrical bore
16,16' Brewing chamber
17,17' Dog
17a Threaded part
18 Spindle
19,19' Trapezoidal thread
20,21 Bearing pin
22,23 Bearing ring
24 Bearing element
25 Electric motor
26,26' Funnel
27,27' Swivelable funnel
27a, b Funnel section
28 Detent device
29,29' Wiper
30 Support plate
31 Drive axis (spindle)
32 Passthrough
33,33a-c Insert (screwed)
34 Strainer
35,36 Swivel axis
37 Guide element
38 Swing arm
39,39a,b Torsion spring
40 Brewing water port
41 Body
42 Tubular spout
43 Thread section
44 Gasket
45 Bore
46 Baffle insert
46a Baffle aperture
47 Non-return valve
48 Spring
49 Valve body
50 Valve seat
51 Axis (brewing part)
52a,b Guide rail
53 Adapter ring
54,54' Chute
55a,b Cutout
56a,b Snap catches
57a,b Guide element
58a,b Guide element
d1,d2 Internal diameter (brewing chamber)

The invention claimed is:

1. Modular brewing unit for a coffee machine, comprising multiple differently constructed brewing parts and a driving part, wherein one brewing part and the driving part are arranged parallel beside each other in a common frame, wherein the brewing part has, arranged concentrically along a common first axis, an upper piston, a lower piston, and a brewing cylinder between the two pistons, having a cylindrical bore to accommodate the two pistons, forming a brewing chamber, and wherein the driving part comprises a spindle that extends along a drive axis parallel to the first axis, is mounted in the frame so as to be rotatable about said drive axis, and is in engagement with the brewing cylinder and the lower piston such that, during a brewing cycle, when the spindle is rotated the brewing cylinder and the lower piston are displaced along the first axis relative to the upper piston which is mounted in fixed manner in the frame, different brewing conditions can be formed by selectively combining the driving part with the differently constructed brewing parts, wherein the brewed coffee is discharged through the upper piston, and that the outlet behaviour in the upper piston can be altered to create different brewing conditions in the brewing part by positioning replaceable inserts in the upper piston.

2. The modular brewing unit according to claim 1, wherein the upper piston has a central passthrough for the outlet, and the replaceable inserts can be inserted, particularly screwed, in the passthrough to create a seal.

3. The modular brewing unit according to claim 1, wherein the replaceable inserts each have a cylindrical body with a concentric bore to allow the brewed coffee to pass through.

4. The modular brewing unit according to claim 3, wherein the replaceable inserts have an external thread section, a transition to a tubular spout at one end, and are furnished with an external seal at the other end.

5. The modular brewing unit according to claim 3, wherein the replaceable inserts are equipped with means for influencing the flow through the bore.

6. The modular brewing unit according to claim 5, wherein the means for influencing the flow through the bore comprise a replaceable baffle.

7. The modular brewing unit according to claim 5, wherein the means for influencing the flow through the bore comprise a non-return valve.

8. Modular brewing unit for a coffee machine, comprising multiple differently constructed brewing parts and a driving part, wherein one brewing part and the driving part are arranged parallel beside each other in a common frame, wherein the brewing part has, arranged concentrically along a common first axis, an upper piston, a lower piston, and a brewing cylinder between the two pistons, having a cylindrical bore to accommodate the two pistons, forming a brewing chamber, and wherein the driving part comprises a spindle that extends along a drive axis parallel to the first axis, is mounted in the frame so as to be rotatable about said drive axis, and is in engagement with the brewing cylinder and the lower piston such that, during a brewing cycle, when the spindle is rotated the brewing cylinder and the lower piston are displaced along the first axis relative to the upper piston which is mounted in fixed manner in the frame, wherein different brewing conditions can be formed by selectively combining the driving part with the differently constructed brewing parts,     wherein the differently constructed brewing parts are designed to accommodate different quantities of coffee powder per brewing cycle and the differently constructed brewing parts differ in respect of the internal diameter of the brewing chamber, and that the outer diameters of the upper and lower pistons are adapted to the internal diameter of the brewing chamber.

\* \* \* \* \*

UNITED STATES PATENT AND TRADEMARK OFFICE
CERTIFICATE OF CORRECTION

| | |
|---|---|
| PATENT NO. | : 10,485,371 B2 |
| APPLICATION NO. | : 15/030626 |
| DATED | : November 26, 2019 |
| INVENTOR(S) | : André Lüssi et al. |

Page 1 of 1

It is certified that error appears in the above-identified patent and that said Letters Patent is hereby corrected as shown below:

In the Specification

Column 1, Line 42, "piston in" should be -- piston 12 in --.

Column 2, Line 25, "chamber is" should be -- chamber 16 is --.

Column 5, Line 64, "axis (FIG. 3)" should be -- axis 35 (FIG. 3) --.

Signed and Sealed this
Twenty-eighth Day of April, 2020

Andrei Iancu
*Director of the United States Patent and Trademark Office*